Figure 5:
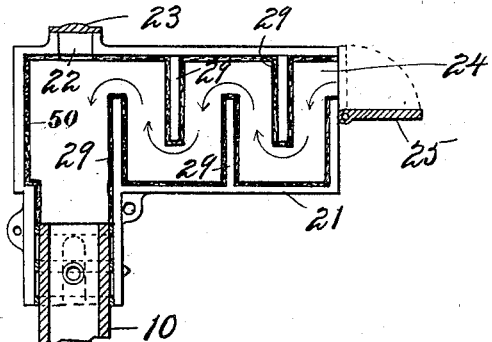

No. 747,007. PATENTED DEC. 15, 1903.
C. W. SMITH.
SMOKE PREVENTING FURNACE.
APPLICATION FILED APR. 12, 1902.
NO MODEL. 3 SHEETS—SHEET 1.
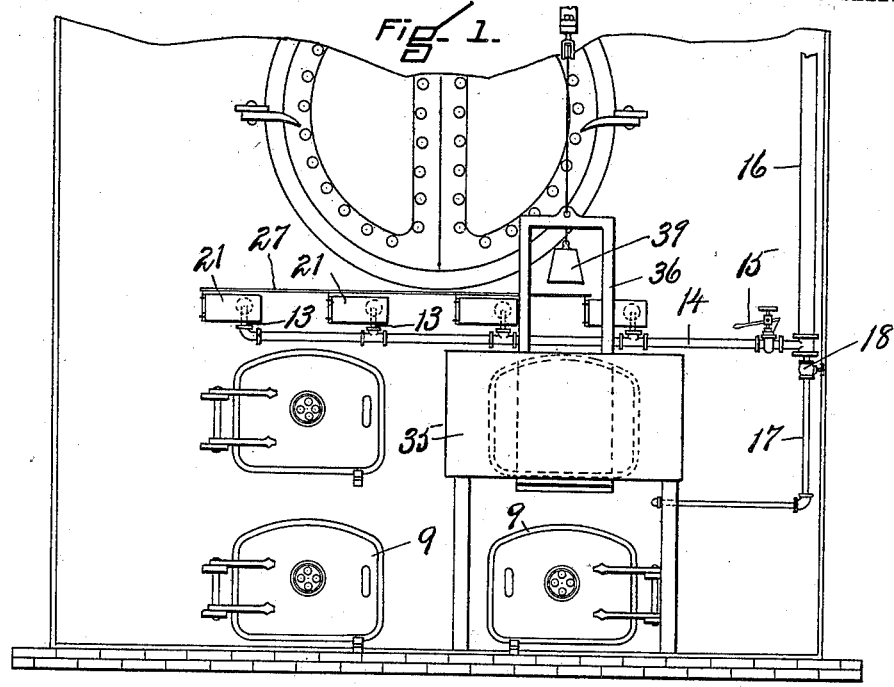
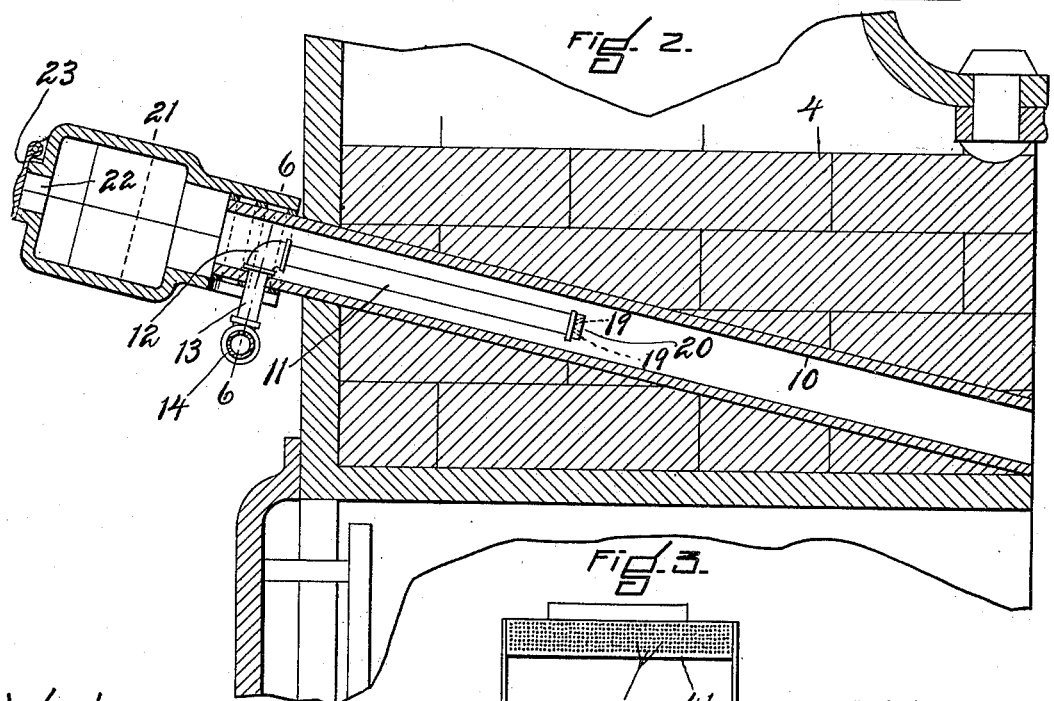
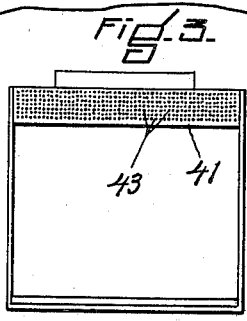
WITNESSES.
E. Batchelder
George Pizzetti
INVENTOR.
C. W. Smith
by Wright Brown & Quimby
Attys.

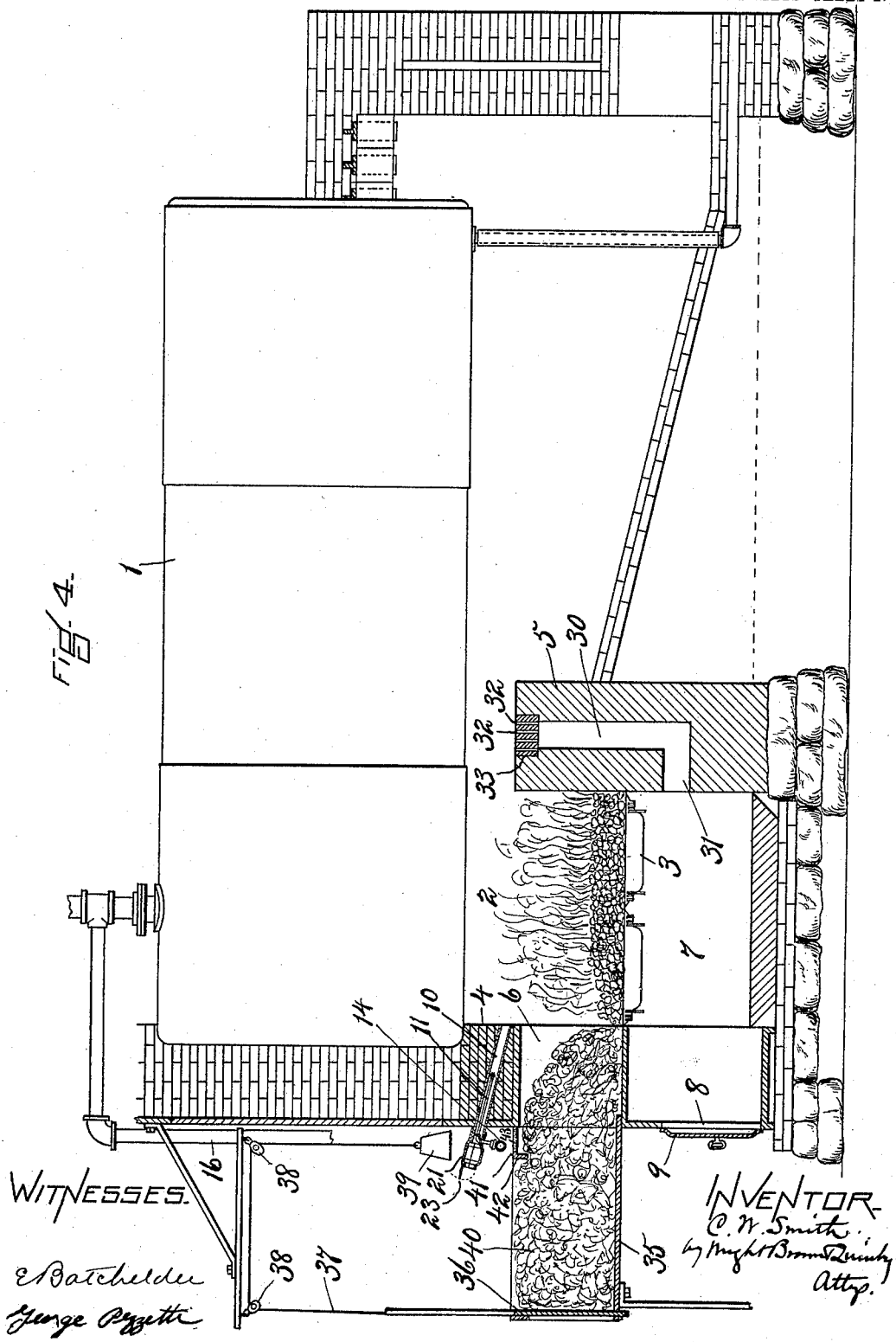

No. 747,007. PATENTED DEC. 15, 1903.
C. W. SMITH.
SMOKE PREVENTING FURNACE.
APPLICATION FILED APR. 12, 1902.
NO MODEL. 3 SHEETS—SHEET 3.

WITNESSES
E. Batchelder
George Pezzetti

INVENTOR
C. W. Smith
by Wright Brown Quimby
attys.

No. 747,007.

Patented December 15, 1903.

UNITED STATES PATENT OFFICE.

CLARENCE W. SMITH, OF CAMBRIDGE, MASSACHUSETTS.

SMOKE-PREVENTING FURNACE.

SPECIFICATION forming part of Letters Patent No. 747,007, dated December 15, 1903.

Application filed April 12, 1902. Serial No. 102,541. (No model.)

*To all whom it may concern:*

Be it known that I, CLARENCE W. SMITH, of Cambridge, in the county of Middlesex and State of Massachusetts, have invented certain new and useful Improvements in Smoke-Preventing Furnaces, of which the following is a specification.

This invention has relation to smoke-preventing furnaces in which jets of steam are employed to force into the furnace and down upon the bed of fuel air which is necessary for the complete combustion of the fuel and the gases distilled from the same, especially immediately after putting on fresh fuel, the steam which is directed upon the incandescent fuel being decomposed into its constituent oxygen and hydrogen. The latter passes off with the distilled gases and being a very readily ignitible gas at a comparatively low temperature makes a prolonged flame reaching from the bed of fuel toward the boiler-tubes, and thus acts as a torch to ignite and consume gases which have been rapidly drawn away from the fire-box by the draft of the chimney, fan, &c., and would otherwise pass off unignited, their uncomsumed carbon making smoke.

The invention further relates to apparatus of this class employing an air-flue in the bridge-wall whereby an increased quantity of air is supplied for the consumption of the volatile products which escape over said bridge-wall.

The objects of my invention are to provide for economical use of steam, for deadening the sound due to the steam-jets, for obtaining access to said jets, and for regulating the air-supply of a plurality of jets.

Further objects of the invention are to keep the steam free from water, to provide an improved disposition of the air-flue in the bridge-wall whereby the ashes accumulating in said flue are more effectively collected and easily removed, and, lastly, to decrease the tendency to the formation of smoke when loose bulky fuel, such as shavings, is employed in feeding the furnace.

The invention consists in the novel features of construction and arrangement which I shall now proceed to describe and claim.

Figure 6:
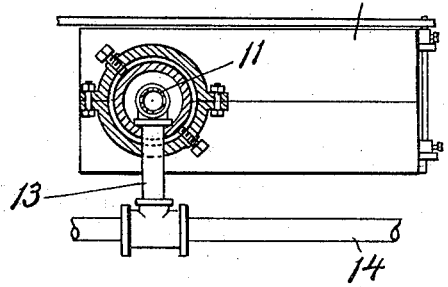
Figures 7, 8:
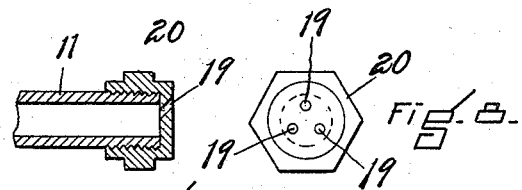
Figures 9, 11:
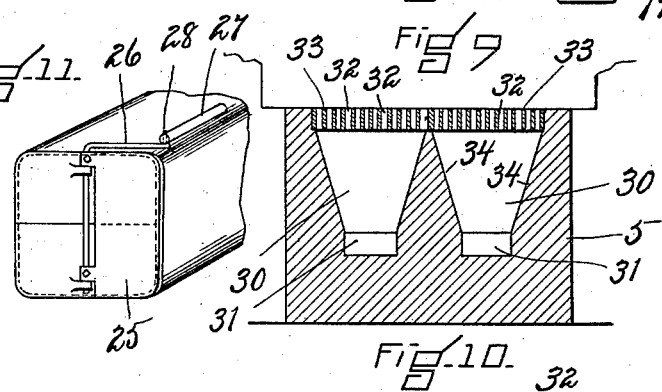
Figure 10:
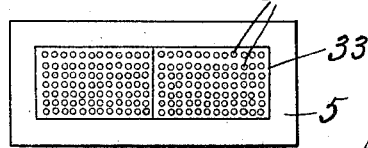

Of the accompanying drawings, Figure 1 represents a front elevation of a boiler and furnace provided with my improvements. Fig. 2 represents an enlarged sectional view showing one of the steam and air jets. Fig. 3 represents a detail plan view of the fuel-feeding box. Fig. 4 represents a longitudinal vertical section of the boiler and setting. Figs. 5 and 6 represent horizontal and vertical sections showing one of the air-boxes. Figs. 7 and 8 represent sectional and end views of one of the steam-nozzles. Figs. 9 and 10 represent, respectively, a transverse vertical section and a plan of the bridge-wall. Fig. 11 represents a perspective view of one end of one of the air-boxes.

The same reference characters indicate the same parts in all the figures.

In the drawings at 1 is represented a return tubular horizontal-shell boiler having a masonry setting, and 2 represents the furnace-inclosure, having the usual grate 3, front wall 4, and bridge-wall 5. Fire-openings 6 are shown at the level of the grate.

7 is the ash-pit located below the grate and having openings 8 provided with doors 9 9.

10 10 are a series of air-tubes embedded in the front wall 4 of the furnace above the fire-doors and containing steam pipes or nozzles 11, which are located in the middle of and parallel to the axes of said tubes. There are four of those jets and tubes shown, two over each fire-door, although their number varies with the width or area of grate, and the several jets are directed slantingly downward toward the locality of the bridge-wall and the rear portion of the grate.

In operating the jets steam is turned on a few minutes before putting on fresh fuel, with the purpose of producing a very hot fire on the surface, and thus creating a reserve of heat which shall neutralize the chilling effect of the colder air admitted when new fuel is put in and preserve a temperature high enough to ignite the gases, which are immediately produced in large amount from the new fuel, and also to effect a decomposition of the steam, the resulting hydrogen acting as a torch and heat-bearer beyond the fire-box and effecting a deferred combustion of carbon, which in common practice unavoidably escapes unconsumed from the bed of fuel and makes smoke.

By directing the jets of steam against the fuel-bed instead of merely intermixing them with the gases and volatile products distilled therefrom the oxygen of the air is caused to directly stimulate the combustion and raise the fuel to incandescence. The steam-nozzles are longitudinal pieces of pipe connected by elbows 12 with short lateral pieces of pipe 13, passing through the walls of the air-tubes 10 and connected with a common horizontal steam-pipe 14, which passes along the front of the boiler.

15 is a lever gate-valve for controlling said pipe, whereby the steam-supply to the nozzles may be quickly regulated. Steam is furnished to the pipe 14 by a vertical pipe 16, connecting with the boiler. At the junction of the horizontal and vertical pipes 14 16 is connected a blow-off or discharge pipe 17, leading to the ash-pit and having a stop-valve 18. Before opening the valve 15 to admit steam to the nozzles the valve 18 is opened and any water of condensation which may have accumulated in the pipe 16 or in the pipe 14 back of valve 15 is blown off into the ash-pit. A supply of dry steam is thereby insured for the steam-nozzles, and the fire is not deadened by water of condensation thrown upon it. Furthermore, the steam in passing from boiler-pressure to that of the atmosphere in the air-tubes 10 10 is superheated, and the heat of the higher-pressure steam is thus preserved and rendered available for preheating the air for combustion and making the combustion more perfect, as a hot blast is more effective in stimulating a fire than a cold one; but if water of condensation were allowed to remain in the steam-pipe a part of the heat available for superheating would be absorbed by this water and wasted.

I provide novel and economical discharge-tips for the steam-nozzles, which, as shown particularly in Figs. 7 and 8, are constructed by drilling a series of very small holes 19 19 in the end wall of a cap 20, which screws on the end of the steam-nozzle 11. These holes are three in number and are divergently or slantingly drilled, so as to direct their jets diagonally against the walls of the air-tube 10. This form of steam-tip is found to be more effective than one having a straight (axial) discharge, and by its use the quantity of steam consumed is reduced to a minimum. The steam-jets are immediately projected against the sides of the tube and together they form a steam-piston, the passage of which through the tube 10 creates a vacuum and draws a large quantity of air through the tube, which mixes with the steam and passes therewith into the furnace.

Three jets for each nozzle have been found, by careful and repeated tests with an anemometer on a boiler-furnace in operation, to force more air in upon the burning fuel than a greater or less number.

21 21 represent a series of mufflers or sound-deadening boxes mounted upon the rear or outer ends of the several air-tubes 10. Each box is attached by a packed joint to its air-tube and consists of upper and lower sections bolted together. Each box has in line with the tube 10 a sight-opening 22, provided with a hinged flap or door 23. By lifting these doors the operation of the steam-nozzles may be inspected and the jet-openings of said nozzles cleaned out, if necessary, by the insertion of a hooked wire through the sight-opening. The doors 23 are normally kept closed to avoid the entrance of an excess quantity of air into the air-tubes. At the end of each box and laterally disposed with respect to the sight-opening 22 is an air-inlet 24, controlled by a hinged door or valve 25. The pintles on the door-hinges are provided at their upper ends with arms 26, and the arms of the several boxes are connected together by a rod 27, having a pivotal connection 28 with each arm. By this arrangement the doors of all the boxes can be moved simultaneously to regulate the air-supply. Each air-box 21 is provided with two series of partitions 29 29, which alternate in arrangement and project from the side walls of the box part way across the interior space thereof, the partitions from one side overlapping those from the other. By this arrangement the sound caused by the steam escaping from the steam-nozzle is compelled to follow a circuitous path in order to reach the outer air and is thereby greatly diminished in amount by repeated reflections. To further deaden the sound, the interiors of the boxes 21 may be lined with a sound-deadening substance, such as fibrous asbestos, (indicated at 50.)

As a means for increasing the supply of oxygen to the gases and volatile products escaping over the bridge-wall two air-ducts 30 30 are formed in said bridge-wall and provided with air-inlets 31, located in the front face of said wall in the ash-pit below the grate 3, and with air-outlets, which consist of numerous perforations 32 32, formed in large fire-clay plates or tiles 33, which cover the upper ends of the flues in the crest of the bridge-wall. The air-inlets 31 are short horizontal recesses of reduced area with respect to the upper ends of the vertical portions of the air-flues, and the sides 34 of said vertical portions slope or converge to meet the said recesses. The recesses or inlet-openings 31 constitute pockets in which the ashes which sift through the perforated plates 33 are collected, the sloping sides 34 of the air-flues facilitating the deposit of ashes in the said pockets. Owing to the disposition of the pockets in the front face of the bridge-wall and opposite to the fire-openings 8 of the ash-pit, the accumulation of ashes in the pockets 31 may be removed from time to time by means of a hoe or other tool inserted through the ash-pit doors.

In Figs. 1 and 4 I have shown the extension furnace-front through which fuel is fed to the furnace without the necessity for opening the usual feed-doors and admitting an excess of cold air at each firing, with consequent waste of heat, chilling of the gases in process of combustion in the furnace, and production of smoke. This novel construction is of special advantage where a loose bulky fuel, like shavings, is used, which burn very rapidly and require frequent opening of the feed-doors. 35 is a box shown attached to one of the feed-openings 6 of the boiler in place of a fire-door, said box being open at its outer end and having a vertically-sliding gate or door 36 mounted in guides at said outer end and adapted to close said opening. The gate is connected by a cord 37 or equivalent passing over pulleys 38 38 with a counterbalancing-weight 39. The gate 36 is lifted from time to time, and the pile of fuel 40, which occupies said box and fills the fire-opening 6, is pushed along into the furnace by the stoker. The body of fuel filling the opening takes the place of the ordinary fire-door, and since the opening is continually filled by the fuel the entrance of undue quantities of cold air is prevented. At the inner edge of the box 35 directly over the fire-opening 6 I locate a plate 41, having a downwardly-turned flange 42 on its outer edge and provided on its horizontal portion with numerous small holes or perforations 43 43, through which a quantity of air enters the mass of fuel and supplies an added quantity of oxygen for promoting combustion of the fuel in the furnace.

I claim—

1. In a boiler-furnace, the combination of the furnace-inclosure, an air-conduit directed thereinto, a steam-discharge nozzle located in said conduit, a muffle-box communicating with said air-conduit and provided with an air-inlet opening, a pintle pivotally mounted adjacent said opening, a valve secured to said pintle, and means connected to said pintle for rotating the same whereby the position of said valve may be changed at will and the quantity of air entering said opening regulated.

2. In a boiler-furnace, the combination of the furnace-inclosure, an air-conduit directed thereinto, a steam-discharge nozzle located in said conduit, a muffle-box communicating with said air-conduit and having an inlet-opening in one end, a sight-aperture being formed in the other end of said muffle-box in line with the air-conduit, a pivoted cover for said aperture, a hinged door adapted to cover said inlet-opening, and means for varying the position of said door.

3. In a boiler-furnace, the combination of the furnace-inclosure, an air-conduit directed thereinto, a steam-discharge nozzle located in said conduit, a muffle-box communicating with said air-conduit and provided with an air-inlet, a pintle rotatably mounted adjacent said inlet and provided with a lateral arm, a valve secured to said pintle, and a rod connected to said lateral arm, whereby said pintle may be rotated.

4. In a boiler-furnace, the combination of the furnace-inclosure, a plurality of air-conduits directed thereinto, a steam-discharge nozzle located in each conduit, a muffle-box communicating with each air-conduit and provided with an air-inlet, a valve hinged adjacent to each inlet and provided with a lateral arm, and a rod connected to the lateral arm of each valve whereby all of said valves are simultaneously controlled.

5. In a boiler-furnace, the combination of the furnace-inclosure, an inclined air-conduit leading thereinto and directed toward the fuel-bed, a steam-discharge pipe located in said conduit, and a cap covering the end of said discharge-pipe and provided with a series of radially-arranged divergent apertures directed toward the walls of the conduit, the wall of said cap intermediate of said apertures being solid and free from perforations whereby all of the jets of steam are discharged radially.

6. In a boiler-furnace, the combination of the furnace-inclosure, an air-conduit leading thereinto, a steam-discharge nozzle located in said conduit, and a muffle-box, the inner walls of which are covered with a sound-deadening material.

7. In a boiler-furnace, the combination of the furnace-inclosure, an air-conduit leading thereinto, a steam-discharge nozzle located in said conduit and a muffle-box, the inner walls of which are covered with a rough fibrous substance to deaden the sound.

8. In a boiler-furnace, the combination of the furnace-inclosure, an air-conduit leading thereinto, a steam-discharge nozzle located in said conduit, and a muffle-box, the inner walls of which are covered with asbestos.

9. In a boiler-furnace, the combination of the furnace-inclosure having a grate and a firing-opening, an open fuel-box in front of said opening provided with a perforated air-plate bridging said box above and adjacent to said firing-opening, a series of air-conduits directed into the furnace-inclosure above said firing-opening, and means for projecting forcing-jets of steam through said air-conduits.

10. In a boiler-furnace, the combination with an air-inlet pipe and a steam-nozzle located therein, of the furnace-inclosure having a grate and a firing-opening, and an open fuel-box in front of said opening provided with a perforated air-plate bridging said box above and adjacent to said opening, said plate having a depending flange on its outer edge.

In testimony whereof I have affixed my signature in presence of two witnesses.

CLARENCE W. SMITH.

Witnesses:
C. F. BROWN,
E. BATCHELDER.